Aug. 7, 1945.  C. J. KOPP  2,380,975
AUTOMATIC CONTROL FOR FLUID OPERATED PISTONS
Filed Aug. 11, 1943  3 Sheets-Sheet 1

Inventor:
Carl J. Kopp,
By: Lee J. Gary
Attorney

Aug. 7, 1945.   C. J. KOPP   2,380,975
AUTOMATIC CONTROL FOR FLUID OPERATED PISTONS
Filed Aug. 11, 1943   3 Sheets-Sheet 2
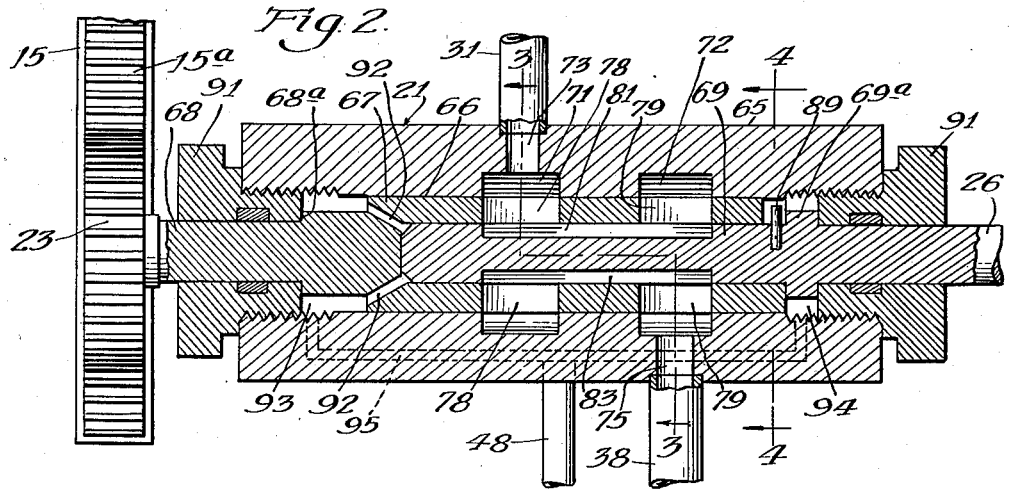
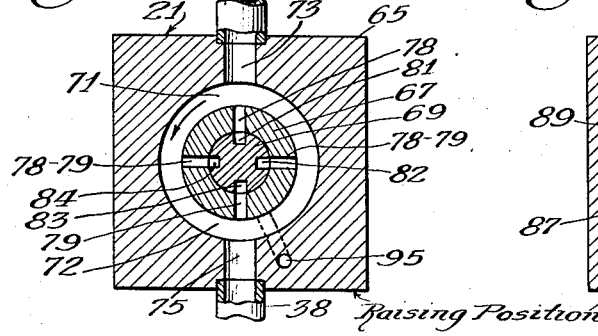
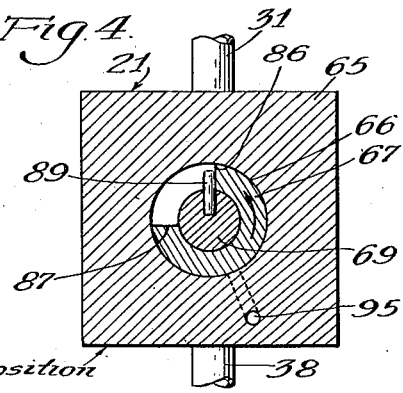
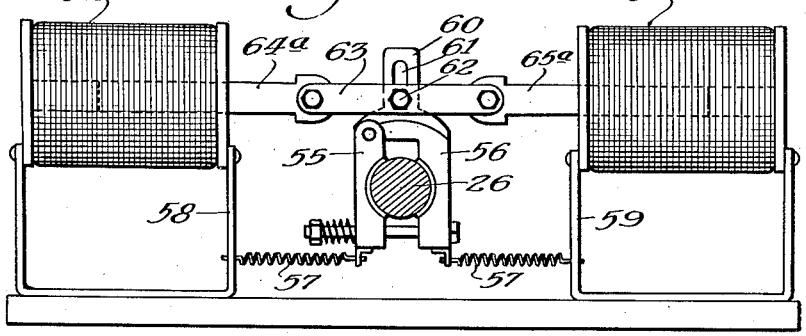
Inventor:
Carl J. Kopp,
By: Lee J. Gary
Attorney Aug. 7, 1945.  C. J. KOPP  2,380,975
AUTOMATIC CONTROL FOR FLUID OPERATED PISTONS
Filed Aug. 11, 1943  3 Sheets-Sheet 3

Lowering Position

Neutral Position

Inventor:
Carl J. Kopp,
By: Lee J. Gary
Attorney.

Patented Aug. 7, 1945

2,380,975

UNITED STATES PATENT OFFICE 2,380,975

AUTOMATIC CONTROL FOR FLUID OPERATED PISTONS

Carl J. Kopp, Chicago, Ill., assignor to Federal Electric Company, Inc., Chicago, Ill., a corporation of New York Application August 11, 1943, Serial No. 498,141

8 Claims. (Cl. 60—97)

The present invention relates to fluid operated control mechanism for controlling the movement or positioning of various elements such as for example, a platen of a press or the bed of a milling or boring machine. More particularly, the present invention is directed to a novel control for co-relating the movement of two fluid operated motors for obtaining balanced movement or positioning of said movable elements, such as a platen or a machine bed.

In certain machines it is necessary to utilize two or more hydraulic pistons for moving certain parts thereof and it has long been a problem to properly control such pistons so as to obtain relatively exact and uniform movement. Generally, such pistons are individually controlled which necessitates the employment of great care and skill as well as time in effecting proper positioning and movement of the elements being controlled.

One of the objects of the present invention is to provide a novel control of the character indicated wherein the movement of several fluid operated motors is co-related as to effect synchronized movement of all pistons.

Another object is to provide an improved control of the character indicated wherein the fluid motors are automatically synchronized with respect to each other so as to maintain a balanced relation and uniform movement of the element or member being controlled.

A further object is to provide an improved control of the character indicated wherein a pair of fluid operated motors are each subject to operation by a separate control valve, and wherein the movement of each motor regulates the control valve for the opposite motor, and the valves are interconnected so as to instantly effect compensating adjustment of one by the other, in the event one motor travels at a rate of speed greater than the other.

Still another object is to provide an improved control of the character indicated which is relatively simple in construction, durable and efficient in operation and which may be economically manufactured.

Other objects and advantages of this invention will be apparent from the following description, taken in connection with the accompanying drawings in which:

Fig. 2 is a vertical axial section through one of the control valves.

Fig. 3 is a staggered trans-axial section, taken as indicated at line 3—3 on Fig. 2, showing one position of relationship of the parts of the valve elements, corresponding to a position for effecting the raising of the pistons.

Fig. 4 is a transverse sectional view taken as indicated at line 4—4 on Fig. 1, showing the relation of the valve elements corresponding to a position for effecting the raising of the pistons.

Fig. 9 is an enlarged transverse section taken at line 9—9 on Fig. 1, showing the mechanism for effecting initial registration and for effecting subsequent nonregistration of the valve elements of the control valves.

It is to be understood that the control apparatus herein disclosed may be operated by fluid, either in the form of gas or liquid, and for purpose of illustration the present invention will hereinafter be described as being operated by liquid such as oil.

Figure 1:
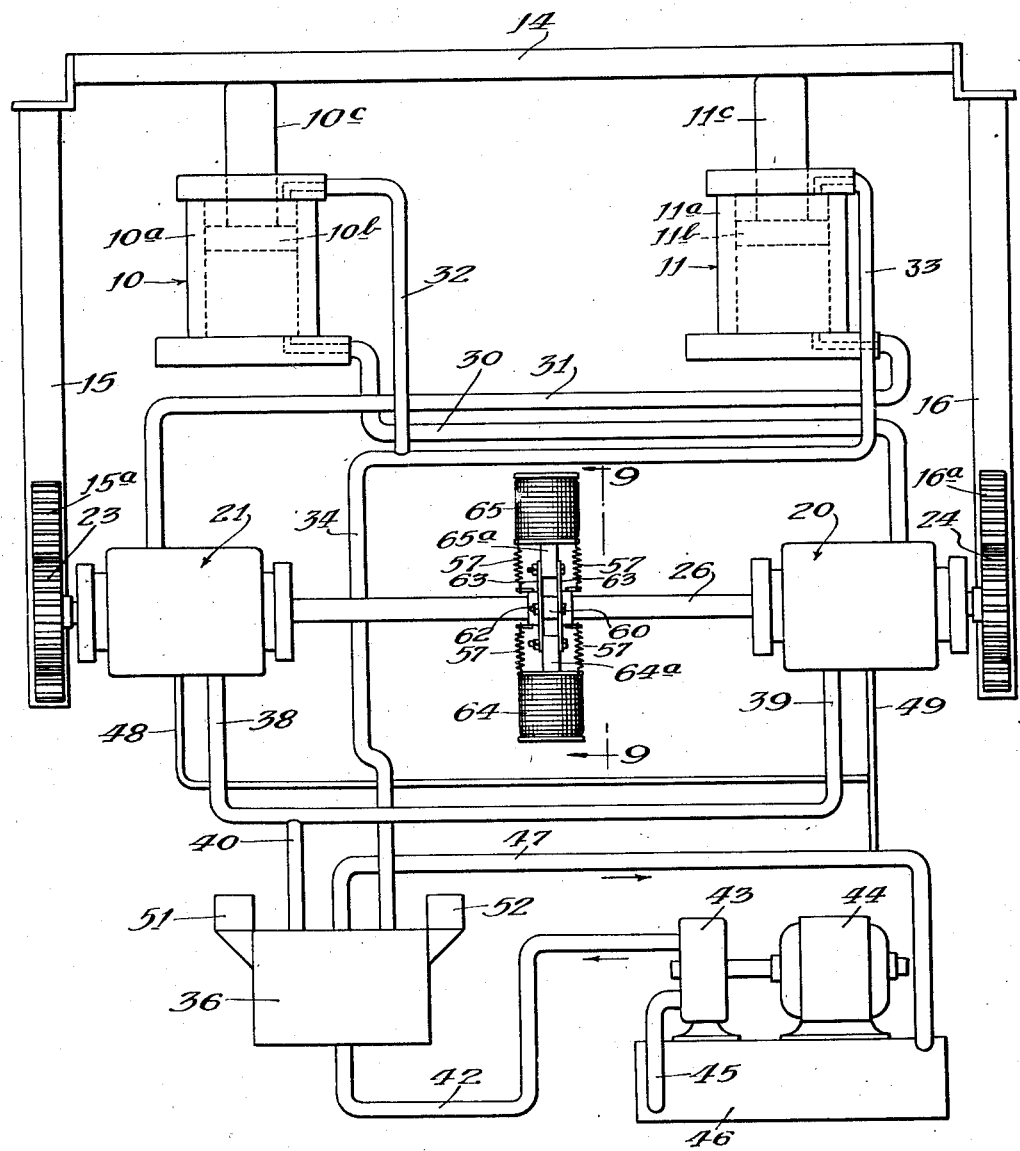
Fig. 1 is a schematic illustration of my novel control apparatus for a pair of fluid operated motors.

In Fig. 1 of the drawings I have shown a pair of fluid operated motors designated generally at 10 and 11, each comprising an upright cylinder 10a and 11a respectively, in which there are vertically movable piston elements 10b and 11b. Said piston elements are provided with piston rods of substantial size, as indicated respectively at 10c and 11c, the upper ends of which directly engage and support a horizontally disposed bed 14 of a machine. The pistons 10b and 11b as will hereinafter be described, serve to raise and lower the horizontally disposed bed 14 within a definite predetermined range and to support the bed at any desired position within its range of movement. In connection with certain types of apparatus, such as the bed of a milling machine, it is of considerable importance that the bed be maintained in a relatively true horizontal plane, at any position of vertical adjustment within its range of movement. As will hereinafter appear, the bed 14 is capable of being moved and positioned within its predetermined range so that the operating surface thereof will at all times be disposed in a relatively true horizontal plane.

Connected to opposite ends of the bed 14 are a pair of depending members 15 and 16, the lower ends of which are formed as toothed racks as indicated at 15a and 16a. The pistons 10b and 11b are adapted to be operated under individually controlled valves as indicated at 20 and 21 respectively, as may be noted in the schematic illustration of Fig. 1 of the drawings, the control valve located below each piston being adapted to control the opposite piston, by conduit connections as will hereinafter be described.

Meshed with the respective racks 15a and 16a are pinions 23 and 24 which serve to adjust the respective control valves 21 and 20. Each of the control valves includes a pair of cooperating valve elements and the pinions 23 and 24 are operably connected to a set of corresponding valve elements in the respective control valves 21 and 20. The other corresponding valve elements of the control valves are interconnected by a horizontally extending shaft 26. It is through the medium of the shaft 26 that one of the control valves serves to adjust the other so as to obtain a compensating adjustment for insuring synchronized, balanced operation of the two pistons 10b and 11b.

As may be seen in Fig. 1 of the drawings, the lower end of the chamber of the cylinder 10a of motor 10 is connected by a conduit 30 to the control valve 20, and the lower end of the chamber of the cylinder 11a of the motor 11 is connected by a conduit 31 to the control valve 21. The upper end of the chamber of the cylinder 10a is connected to a conduit 32, while the upper end of the chamber of the cylinder 11a is connected to a conduit 33, and the two conduits 32 and 33 are connected to a main conduit 34 which in turn is connected to a spring centered conventional reversing valve 36. The opposite side of the control valve 21 is connected by a conduit 38 and the opposite side of the control valve 20 is connected to conduit 39, and the two conduits 38 and 39 are in turn connected by a conduit 40 to the reversing valve 36.

Oil is supplied to the system through the reversing valve 36 by a conduit 42 which is connected to a pump 43 driven by a motor 44 for supplying oil through means of a conduit 45 from a storage tank 46. The reversing valve 36 is also connected by a conduit 47 to the storage tank to provide a return duct for the oil from the system to the source of supply. Control valves 21 and 20 are also provided with conduits 48 and 49 which are jointed together to the return conduit 47 and serve to relieve the control valves of accumulated oil seepage which prevents building up of back pressure within said control valves, as will hereinafter be described.

As illustrated in Fig. 1 of the drawings, the reversing valve is adapted to be moved to either of two main operative positions of adjustment by means of a pair of solenoids indicated at 51 and 52. It is to be understood, however, that the reversing valve might be operated by any suitable mechanical means or may be manually operated.

When the apparatus is inoperative or disposed at a neutral position, the control valves 21 and 20 are normally closed, that is, with the ports of the valve elements out of registration. To open the control valves, the shaft 26 must be initially adjusted by a slight amount of angular rotation, and as herein shown in the range of 45°, in either direction, for effecting registration of the ports of the valve elements of the respective control valves. The means for maintaining the control valves in neutral position and for moving the valves into operating position, is illustrated in Fig. 9 and includes a pair of friction blocks 55 and 56 yieldingly embracing the shaft 26, together with two pair of springs 57, extending in opposite directions and connecting the friction blocks to frame members indicated at 58 and 59, so as to tend to centralize the shaft 26 within a predetermined range of movement. The friction blocks 55 and 56 are pivotally connected at their upper ends, and one of the blocks is formed with an arm 60, provided with an elongated slot 61 through which extends a bolt 62, located centrally of a pair of operating bars 63, the opposite ends of which bars are pivotally connected to the cores 64a and 65a of a pair of electro magnets 64 and 65. The magnets may be selectively energized for drawing the arm 60 in the direction of the magnet energized, and by reason of the friction blocks 55 and 56 embracing the shaft 26, said shaft is rotated through an arc of approximately 45°. When the shaft is so rotated as will hereinafter appear, the ports of the cooperating valve elements of each of the control valves are in registration. When the magnet is de-energized the springs 57, acting on the friction blocks 55 and 56, return the shaft 26 to a neutral position. The friction exerted by the blocks 55 and 56, while causing such rotation of the shaft, yet is not sufficiently great as to preclude rotation of the shaft within the blocks 55 and 56. It is to be understood that the control valves 20 and 21 are identical in construction and are connected in the system in reversed relation. Therefore, a detailed description of the construction and operation of the control valve 21 will suffice.

The control valve 21 includes a main body 65 formed with a cylindrical bore 66, in which there is snugly fitted a valve element 67, in the form of a sleeve, integrally connected to a stub shaft 68 on which the pinion 23 is rigidly mounted. The terminal portion of the shaft 26, as herein indicated at 69, constitutes a second valve element which is telescopically fitted within the sleeve valve element 67.

Figure 5:
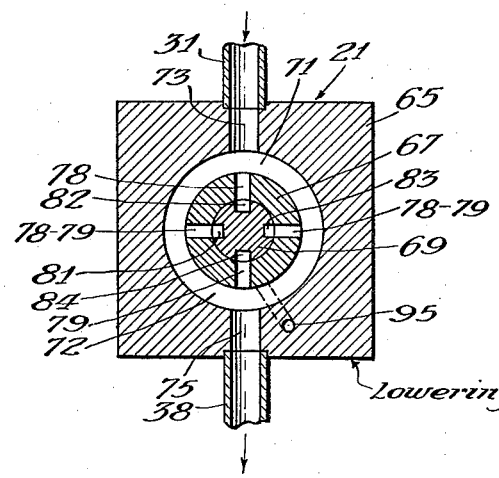
Figs. 5 and 6 are sectional views similar to Figs. 3 and 4, showing the relationship of the valve elements corresponding to a position for effecting a lowering movement of the pistons.
Figure 7:
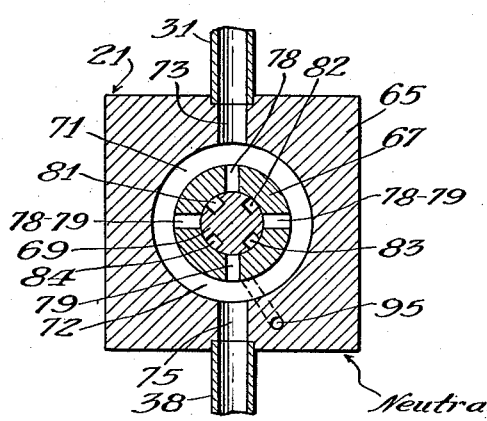
Figs. 7 and 8 are sectional views corresponding to Figs. 3 and 4, showing the valve elements in a neutral or inoperative position of adjustment.

Within the bore of the body 65 there is provided a pair of axially spaced apart annular chambers 71 and 72, the chamber 71 being in direct communication with a port 73 with which is registered the end of the conduit 31. The chamber 72 is in direct communication with a port 75 which, in turn, is registered with the conduit 38. The sleeve valve element 67 is provided with two sets of axially spaced apart ports disposed in registration with the respective chambers 71 and 72. The ports in registration with the chamber 71 are designated 78, while the ports in registration with the chamber 72 are designated 79. There are four ports in each set, spaced apart approximately 90°, as may be seen in Fig. 3 of the drawings. Because the valve sections, as represented in Figs. 3, 5 and 7 of the drawings, are staggered offset sections, the reference characters for the two ports shown substantially in alignment with the horizontal axis through the shaft 26, are accorded the reference characters 78 and 79. The inner cooperating valve element 69 is provided with four ports, in the form of key slots or longitudinally extending passageways, spaced 90° apart, and which for clarity are accorded separate reference characters 81, 82, 83 and 84. These passageways terminate substantially in the planes of the outer walls of the respective ports 78 and 79 of the cooperating valve element 67.

The free or open end of the sleeve 67 has a segmental portion removed therefrom to provide a pair of abutment shoulders 86 and 87, adapted to be engaged by a stop pin 89, fixedly secured in the terminal portion 69 of the shaft 26, as seen in the drawings. As will be presently described the control valve may assume either of two main operating positions with the cooperating valve elements 67 and 69 rotatably adjusted relatively to each other in a range of approximately 90°. The abutment shoulders 86 and 87 are located in such relation to each other with allowance for the thickness of stop pin 89, so as to accommodate such 90° of rotary movement of the valve elements relatively to each other.

The stub shaft 68, adjacent the closed end of the sleeve valve element 67, is formed with a stop shoulder 68a and the terminal portion 69 constituting the other valve element, is provided with a stop collar 69a, disposed in abutting relation to the end of the sleeve 67, as seen in the drawings. The shoulder 68a and the outer end of the collar 69a are adapted to be engaged by packing nuts 91 threaded into the respective ends of the bore of the valve body so as to maintain the cooperating valve elements 67 and 69 in proper cooperating relation within the valve body.

The closed end of the sleeve 67 is provided with a plurality of bleeder ports 92, which open into a cavity indicated at 93, intermediate the end of the sleeve and the shoulder 68a, for accumulating seepage of oil from between the valve elements 67 and 69, and between the valve element 67 and the inner wall of the valve body. The opposite end of the valve assembly is provided with a cavity 94, surrounding the collar 69a, for similarly accumulating oil seepage and the two cavities 93 and 94 are interconnected by a duct 95 which, in turn, is connected to the conduit 48 for draining off the accumulated seepage and returning it to the storage tank 46. By relieving the control valve of such accumulated seepage, it eliminates the possibility of back pressure within the control valve, which might impair the operation thereof.

*Operation*

It is to be assumed that for convenience in operation the respective solenoids 51 and 52 are connected in separate electrical circuits including the electromagnets 65 and 64 respectively, and which circuits may be controlled by a conventional form of switch.

When it is desired to raise the bed 14 by the motors 10 and 11, the solenoid 51 and the electromagnet 65 are simultaneously energized. Energizing of the magnet 65 moves the valve elements 69 from the neutral position seen in Figs. 7 and 8 of the drawings to the position seen in Figs. 3 and 4 of the drawings, so as to dispose the stop pins 89 in engagement with the abutment shoulders 86. Such adjustment is merely the result of rotary movement of the valve elements 69 within their cooperating sleeves 67, which results from clockwise rotation of the shaft 26, by the action of the electromagnet 65 on the friction blocks 55, 56 (as viewed from the right hand end of Fig. 1 of the drawings). In this position of adjustment of the valve elements the passageways 81, 82, 83 and 84 are rotated 45° from the position seen in Fig. 7 to the position seen in Fig. 3 of the drawings, in full registration with both sets of ports 78 and 79 of the sleeves 67.

The operation of the reversing valve by the solenoid 51 completes the registration of the ports of said valve to provide communication between the conduits 42 and 40 for supplying the oil to the control valve 21 and 20, from whence it is fed through the registered ports of the cooperating valve elements into the conduits 31 and 30 respectively, and thence into the lower ends of the chambers of the respective cylinders 11a and 10a of the motors 11 and 10 respectively. The oil at the upper end of the chambers in the cylinders 11a and 10a is permitted to flow through the conduits 33 and 32 into conduit 34, through the reversing valve and into the conduit 47 for discharge into the storage tank 46. As the oil is supplied in the bottom of the chambers of the cylinders of the two motors, the piston elements 11b and 10b raise the bed 14, and through the racks 15 and 16 cause rotation of the pinions 23 and 24. As these pinions rotate they simultaneously rotate the sleeve valve elements 67, and due to the fact that their abutment shoulders 86 are in engagement with the stop pins 89, rotation is imparted also to the inner valve elements 69 which are an integral part of the shaft 26, so that the shaft 26 is caused to rotate within the friction blocks 55 and 56.

As long as the piston elements of the respective motors travel at a uniform synchronized speed, the cooperating valve elements of each of the control valves remain in registered relation and equal quantities of oil are continuously supplied to the lower ends of the chambers of the respective cylinders. Just as soon, however, as one of the piston elements travels at a rate of speed slightly in excess of the other piston element, the pinion rotated by the rack connected to the bed immediately adjacent such rapidly moving piston, causes the shaft 26 to rotate at a rate faster than the travel of the sleeve of the other control valve so as to move the stop pin 89 out of engagement with the abutment shoulder 86 of said other control valve, and thereby move the ports of the cooperating valve element of said other control valve out of registration with each other, thereby reducing or shutting off the flow of oil to the piston travelling at a speed greater than the other piston.

To state it differently, if the piston element 10b moves at a speed greater than piston element 11b, the pinion 23 will rotate the shaft 26 so as to move the inner valve element 69 of the control valve 20 out of registration with its cooperating sleeve valve element 67, thereby reducing or shutting off the supply of oil to the lower end of the chamber of the cylinder 10a which controls the movement of the piston 10b.

Figure 8:
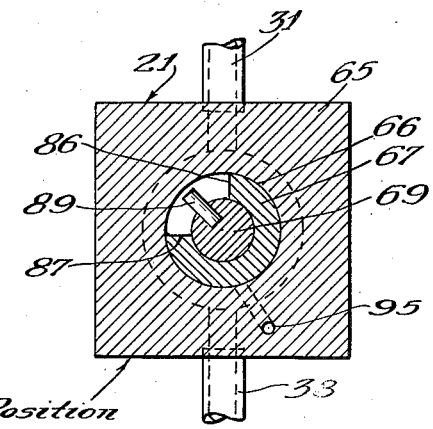

When the bed 14 arrives at a predetermined position, the circuit including the solenoid 61 and magnet 65 is opened and the reversing valve assumes its neutral position of adjustment, so as to seal the oil within the system, including the pistons and completing a by-pass circuit between the supply conduit 42 and the conduit 47, so that the oil being pumped merely recycles to the storage tank. When the magnet 65 is de-energized by the breaking of said electrical circuit, the springs 57 acting through the friction blocks 55 and 56, rotate the shaft 26 in counterclockwise direction so as to dispose the inner valve elements 69 of the respective control valves in the neutral position as seen in Figs. 7 and 8 of the drawings, with the ports or passageways thereof disposed out of registration with the ports of the sleeves 67.

Figure 6:
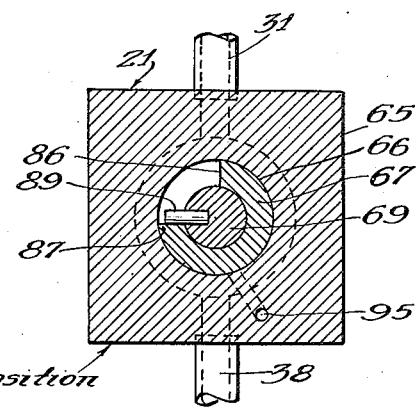

When it is desired to lower the bed 14 another electrical circuit is completed for energizing the solenoid 52 and the magnet 64. When the solenoid 52 is energized the reversing valve assumes another position of operative adjustment, and the electromagnet 64 causes the shaft 26 to be moved in opposite direction through an arc of 45°, to cause the stop pins 89 of the respective control valves to engage the abutment shoulders 87 of the sleeve valve elements 67 as seen in Fig. 6 of the drawings. In this position of adjustment the passageways 81, 82, 83 and 84 of the inner valve elements 69 have been rotated in counter-clockwise direction into registration with the two sets of ports 78 and 79 in the sleeves 67.

Such adjustment of the reversing valve completes port registration for the supply of oil from the conduit 42 through the conduit 34, into the branch conduits 32 and 33 to the upper ends of the chambers of the cylinders 10a and 11a of the respective motors.

The oil in the lower ends of the chambers, below the piston elements 10b and 11b, is permitted to discharge through the conduits 30 and 31 into the respective control valves 20 and 21 from whence it is permitted to flow into the conduits 39 and 38 into the conduit 40, through the reversing valve, and back through the return conduit 47 to the storage supply tank 46. As the bed 14 lowers the racks 15a and 16a rotate the pinions 23 and 24 in clockwise direction and thereby cause the sleeves 67 of the control valves, through their abutment shoulders 87, as may be seen in Fig. 6 of the drawings, to rotate the inner valve elements 69 and the shaft 26 which serves as the means for interconnecting said elements.

The downward movement of the bed 14 is continuous and uniform with the bed 14 at all times being disposed in a true horizontal plane as long as the respective piston elements move in balanced synchronized relation to each other. If one of the piston elements moves downwardly at a rate of speed greater than the other piston element, then the rack associated with the bed, immediately adjacent said piston element, causes the pinion associated therewith to rotate at a greater rate of speed, and thus rotates the shaft 26 at a greater rate of speed so that the inner cooperating valve element 69, of the opposite control valve, rotates faster than its cooperating sleeve, in other words moves at a rate so that the stop pin 89 moves out of engagement with the abutment shoulder 87 and thereby disposes the ports of the cooperating valve element 69, out of full registration with the ports of the sleeve 67, for reducing or shutting off the supply of oil from the lower end of the cylinder of the piston moving at the greater rate of speed.

As described in connection with the raising action, when the control mechanism is adjusted as described, the shaft 26 is permitted to rotate within the friction blocks 55 and 56. When the circuit to the solenoid 52 and magnet 64 is broken, the shaft 26 is rotated by the friction blocks approximately 45° so as to dispose the inner cooperating valve elements 69 in their neutral position, with respect to the cooperating valve elements 67 as seen in Figs. 7 and 8 of the drawings. Simultaneously the fluid within the system becomes sealed because the reversing valve returns to its neutral position, sealing the ends of conduits 34 and 40, and completing the by-pass circuit between the conduit 42 and the return conduit 47, to permit re-cycling of the oil through the reversing valve to the storage tank.

It is to be understood that if desired suitable limit switches may be incorporated in the respective electrical circuits for the solenoids and magnets for effecting opening of the circuits when the piston elements arrive at either of their two limiting positions of movement, or if desired such limit switches may be actuated by the element being controlled, in other words, when the bed 14 arrives at either of its two limit positions of adjustment.

While I have herein shown and described a preferred embodiment of my invention, manifestly it is capable of modification and rearrangement of parts without departing from the spirit and scope thereof. I do not, therefore, wish to be understood as limiting this invention to the precise embodiment herein disclosed, except as I may be so limited by the appended claims.

I claim as my invention:

1. Fluid operated control mechanism comprising two fluid operated devices, each including a cylinder and a piston element in the cylinder and movable in response to fluid pressure in the cylinder, a control valve for each device for controlling the flow of fluid into or out of one end of the cylinder, said valves each including a pair of cooperating rotatable valve elements having ports adapted to be registered with each other, separate means operable in direct response to movement of each of said piston elements, each of said means being operably connected to and serving to effect rotation of one of the valve elements of the control valve for the opposite device, a shaft interconnecting the other elements of said control valves for effecting compensating adjustment of one control valve by the other in event that the piston element of one device moves at a rate of speed in excess of the rate of speed of the piston element of the other device, means normally acting to maintain said shaft in its neutral position, a lost motion driving connection between each pair of valve elements whereby the valve element operated by the means responsive to the movement of the piston element rotates and imparts rotation to the other valve element of the pair and causing rotation of the shaft, said elements maintaining such relation as long as the speed of movement of both piston elements remains synchronized, a reversing valve, conduits connecting the reversing valve to the control valves, conduits connecting the control valves to corresponding ends of the cylinders of said devices, conduits connecting the opposite ends of the cylinders to the reversing valve, and means for supplying fluid under pressure to said reversing valve.

2. Fluid operated control mechanism comprising two fluid operated devices, each including a cylinder and a piston element in the cylinder and movable in response to fluid pressure in the cylinder, a control valve for each device for controlling the flow of fluid into or out of one end of the cylinder, said valves each including a pair of cooperating rotatable valve elements having ports adapted to be registered with each other, separate means operable in direct response to movement of each of said piston elements, each of said means being operably connected to and serving to effect rotation of one of the valve elements of the control valve for the opposite device, a shaft interconnecting the other elements of said control valves for effecting compensating adjustment of one control valve by the other in event that the piston element of one device moves at a rate of speed in excess of the rate of speed of the piston element of the other device a lost motion driving connection between each pair of valve elements, whereby the valve element operated by the means responsive to the movement of the piston element rotates and imparts rotation to the other valve element of the pair and causing rotation of the shaft, said elements maintaining such relation as long as the speed of movement of both piston elements remains synchronized, a reversing valve adjustable to either of two operating positions for causing movement of the respective piston elements in either of two opposite directions, conduits connecting the reversing valve to the control valves, conduits connecting the control valves to corresponding ends of the cylinders of said devices, conduits connecting the opposite ends of the cylinders to the reversing valve, and means for supplying fluid under pressure to said reversing valve.

3. Fluid operated control mechanism comprising two fluid operated devices, each including a cylinder and a piston element in the cylinder and movable in response to fluid pressure in the cylinder, a control valve for each device for controlling the flow of fluid into or out of one end of the cylinder, said valves each including a pair of cooperating rotatable valve elements having ports adapted to be registered with each other, separate means operable in direct response to movement of each of said piston elements, each of said means being operably connected to and serving to effect rotation of one of the valve elements of the control valve for the opposite device, a shaft interconnecting the other elements of said control valves for effecting compensating adjustment of one control valve by the other in event that the piston element of one device moves at a rate of speed in excess of the rate of speed of the piston element of the other device a lost motion driving connection between each pair of valve elements, whereby the valve element operated by the means responsive to the movement of the piston element rotates and imparts rotation to the other valve element of the pair and causing rotation of the shaft, said elements maintaining such relation as long as the speed of movement of both piston elements remains synchronized, a reversing valve adjustable to either of two operating positions for causing movement of the respective piston elements in either of two opposite directions, conduits connecting the reversing valve to the control valves, conduits connecting the control valves to corresponding ends of the cylinders of said devices, conduits connecting the opposite ends of the cylinders to the reversing valve, means for supplying fluid under pressure to said reversing valve, spring means normally tending to maintain said shaft at a neutral position with the valve elements of each of said control valves out of registration, and means for rotating the shaft, against the reaction of the spring means for effecting registration of the valve elements of each of the respective control valves.

4. Fluid operated control mechanism comprising two fluid operated devices, each including a cylinder and a piston element in the cylinder and movable in response to fluid pressure in the cylinder, a control valve for each device for controlling the flow of fluid into or out of one end of the cylinder, said valves each including a pair of cooperating rotatable valve elements having ports adapted to be registered with each other, separate means operable in direct response to movement of each of said piston elements, each of said means being operably connected to and serving to effect rotation of one of the valve elements of the control valve for the opposite device, a shaft interconnecting the other elements of said control valves for effecting compensating adjustment of one control valve by the other in event that the piston element of one device moves at a rate of speed in excess of the rate of speed of the piston element of the other device a lost motion driving connection between each pair of valve elements, whereby the valve element operated by the means responsive to the movement of the piston element rotates and imparts rotation to the other valve element of the pair and causing rotation of the shaft, said elements maintaining such relation as long as the speed of movement of both piston elements remains synchronized, a reversing valve, conduits connecting the reversing valve to the control valves, conduits connecting the control valves to corresponding ends of the cylinders of said devices, conduits connecting the opposite ends of the cylinders to the reversing valve, means for supplying fluid under pressure to said reversing valve, electrically operated means for adjusting the reversing valve to either of two operating positions for causing movement of the respective piston elements in either of two opposite directions, means yieldingly maintaining said shaft at a neutral position with the valve elements of each control valve out of registration, and means operable coincidentally with said electrically operated means for rotating the shaft, for effecting registration of the valve elements of the respective control valves.

5. Fluid operated control mechanism comprising two fluid operated devices, each including a cylinder and a piston element in the cylinder and movable in response to fluid pressure in the cylinder, a control valve for each device for controlling the flow of fluid into or out of one end of the cylinder, said valves each including a pair of cooperating rotatable valve elements having ports adapted to be registered with each other, separate means operable in direct response to movement of each of said piston elements, each of said means being operably connected to and serving to effect rotation of one of the valve elements of the control valve for the opposite device, a shaft interconnecting the other elements of said control valves for effecting compensating adjustment of one control valve by the other in event that the piston element of one device moves at a rate of speed in excess of the rate of speed of the piston element of the other device, a lost motion driving connection between each pair of valve elements, whereby the valve element operated by the means responsive to the movement of the piston element rotates and imparts rotation to the other valve element of the pair and causing rotation of the shaft, said elements maintaining such relation as long as the speed of movement of both piston elements remains synchronized, a reversing valve, conduits connecting the reversing valve to the control valves, conduits connecting the control valves to corresponding ends of the cylinders of said devices, conduits connecting the opposite ends of the cylinders to the reversing valve, and means for supplying fluid under pressure to said reversing valve.

6. Fluid operated control mechanism comprising two fluid operated devices, each including a cylinder and a piston element in the cylinder and movable in response to fluid pressure in the cylinder, a control valve for each device for controlling the flow of fluid into or out of one end of the cylinder, said valves each including a pair of cooperating rotatable valve elements having ports adapted to be registered with each other, separate means operable in direct response to movement of each of said piston elements, each of said means being operably connected to and serving to effect rotation of one of the valve elements of the control valve for the opposite device, a shaft interconnecting the other elements of said control valves for effecting compensating adjustment of one control valve by the other in event that the piston element of one device moves at a rate of speed in excess of the rate of speed of the piston element of the other device, one valve element of each pair including two circumferentially spaced apart ports, means for moving the shaft to initially effect registration of each pair of valve elements with either of said two ports, a lost motion driving connection between each pair of valve elements for causing simultaneous rotation of each pair of elements in registered relation when the speed of movement of the piston elements is synchronized, a reversing valve, conduits connecting the reversing valve to the control valves, conduits connecting the control valves to corresponding ends of the cylinders of said devices, conduits connecting the opposite ends of the cylinders to the reversing valve, and means for supplying fluid under pressure to said reversing valve.

7. Fluid operated control mechanism comprising two fluid operated devices, each including a cylinder and a piston element in the cylinder and movable in response to fluid pressure in the cylinder, a control valve for each device for controlling the flow of fluid into or out of one end of the cylinder, said valves each including a pair of cooperating rotatable valve elements having ports adapted to be registered with each other, separate means operable in direct response to movement of each of said piston elements, each of said means being operably connected to and serving to effect rotation of one of the valve elements of the control valve for the opposite device, a shaft interconnecting the other elements of said control valves for effecting compensating adjustment of one control valve by the other in event that the piston element of one device moves at a rate of speed in excess of the rate of speed of the piston element of the other device a lost motion driving connection between each pair of valve elements, whereby the valve element operated by the means responsive to the movement of the piston element rotates and imparts rotation to the other valve element of the pair and causing rotation of the shaft, said elements maintaining such relation as long as the speed of movement of both piston elements remains synchronized, a reversing valve, conduits connecting the reversing valve to the control valves, conduits connecting the control valves to corresponding ends of the cylinders of said devices, conduits connecting the opposite ends of the cylinders to the reversing valve, means for supplying fluid under pressure to said reversing valve, means for adjusting the reversing valve to either of two operating positions for causing movement of the piston elements in either of two opposite directions, means tending to yieldingly maintain the shaft at a neutral position with the valve elements out of registration, and means for frictionally rotating the shaft, against the reaction of the yielding means, for effecting registration of each pair of valve elements.

8. In a fluid operated control mechanism, a pair of fluid motors, a control valve for each motor, said valves each including a pair of cooperating rotatable valve elements having ports for registry with each other, separate means operable in direct response to movement of said motors, each of said means being operatively connected to and serving to effect rotation of one of the valve elements of the control valve for the opposite motor, a shaft interconnecting the other elements of said control valves for effecting compensating adjustment of one control valve by the other in event one motor moves at a greater rate of speed than the other motor, and a lost motion driving connection between each pair of valve elements, whereby the valve element operated by the means responsive to movement of the motor rotates and imparts rotation to the other valve element of the pair and causes rotation of the shaft, said elements maintaining such relation as long as the speed of movement of both motors remains synchronized.

CARL J. KOPP.